US006602574B1

(12) United States Patent
Daton-Lovett

(10) Patent No.: US 6,602,574 B1
(45) Date of Patent: Aug. 5, 2003

(54) EXTENDABLE, ROLLABLE MEMBER

(75) Inventor: Andrew J. Daton-Lovett, London (GB)

(73) Assignee: Rolatube Technology Limited (GB)

( * ) Notice: Subject to any disclaimer, the term of this patent is extended or adjusted under 35 U.S.C. 154(b) by 0 days.

(21) Appl. No.: 09/701,423

(22) PCT Filed: May 28, 1999

(86) PCT No.: PCT/GB99/01708

§ 371 (c)(1),
(2), (4) Date: Nov. 29, 2000

(87) PCT Pub. No.: WO99/62812

PCT Pub. Date: Dec. 9, 1999

(30) Foreign Application Priority Data

Jun. 4, 1998 (GB) ............................................ 9812057

(51) Int. Cl.[7] ............................ B32B 5/08; B32B 1/00; B32B 3/00; B32B 3/20; B32B 1/08; E04H 12/18; B27N 3/10; B27N 3/18

(52) U.S. Cl. ..................... 428/105; 428/34.5; 428/36.1; 428/107; 428/109; 428/113; 428/175; 428/906; 428/188; 428/34.1; 264/257; 264/319; 52/108; 442/60; 442/218

(58) Field of Search .............................. 428/34.1, 10.5, 428/34.5, 36.1, 107, 109, 110, 113, 174, 188, 175, 906; 264/241, 257, 319; 156/60, 161, 165, 174; 442/60, 218; 52/108

(56) References Cited

U.S. PATENT DOCUMENTS 3,144,104 A * 8/1964 Weir et al. .................... 182/41
3,252,173 A * 5/1966 Robinsky ...................... 14/2.4
3,361,377 A * 1/1968 Trexler, Jr. .............. 242/390.2
3,387,414 A * 6/1968 Adams ....................... 206/216
3,434,674 A * 3/1969 Groskopfs ............... 242/390.2
3,503,164 A * 3/1970 Berry et al. .................. 52/108
3,696,568 A * 10/1972 Berry .......................... 52/108
3,832,240 A * 8/1974 Kubo et al. ................. 148/684
3,975,581 A 8/1976 Lowenhar .................... 333/33
4,096,459 A 6/1978 Lowenhar ................... 333/243
4,265,690 A * 5/1981 Lowenhar ................... 156/148
5,691,023 A * 11/1997 Keller ..................... 229/87.01

FOREIGN PATENT DOCUMENTS

WO 97/35706 10/1997
WO 88/08620 11/1998

* cited by examiner

*Primary Examiner*—Harold Pyon
*Assistant Examiner*—Patricia L. Nordmeyer
(74) *Attorney, Agent, or Firm*—Nixon & Vanderhye PC

(57) ABSTRACT

An extendible, coilable member is reversibly configurable between a coiled form and an extended form. At least one surface of the member, typically an inner surface, is provided with resilient protrusions. Upon extension of the member to the extended form, the protrusions adopt a first state in which they protrude from the surface of the member. Upon rolling of the member to the coiled form, the protrusions flex so as to lie between the turns of the coiled member.

14 Claims, 2 Drawing Sheets

EXTENDABLE, ROLLABLE MEMBER

This application is the national phase of international application PCT/GB99/01708 filed May 28, 1999 which designated the U.S.

BACKGROUND OF THE INVENTION

The present invention relates to an extendible, coilable member.

In WO-A-88/08620 and WO-A-97/35706, the entire disclosures of which are incorporated herein by reference, there are disclosed extendible; coilable members which are reversibly configurable between a coiled form and an extended form. A perspective view of an example of such a member 1 is shown in FIG. 1 in part coiled form 1*a* and part extended form 1*b*.

SUMMARY OF THE INVENTION

According to a first aspect of the present invention, there is provided an extendible, coilable member which is reversibly configurable between a coiled form and an extended form, at least one surface of which is provided with one or more resilient protrusions such that upon extension of the member to the extended form, the or each protrusion adopts a first state in which it protrudes from the surface of the member, and which upon rolling of the member to the coiled form flexes so as to lie between the turns of the coiled member.

The protrusions will typically be in a relaxed state when the member is in its extended form and collapse against said surface when the member is in its coiled form. The member has particular utility in providing a jacket for surrounding another object, such as a pipe, for thermal, sound or electrical insulation for example.

Said surface may be an inner surface and the or each protrusion may protrude inwardly of the member when said member is in its extended form.

Said surface may be an outer surface and the or each protrusion may protrude outwardly of the member when said member is in its extended form.

Each of inner and outer surfaces of the member may be provided with at least one protrusion, the or each protrusion on the inner surface protruding inwardly of the member and the or each protrusion on the outer surface protruding outwardly of the member when said member is in its extended form.

There may be provided a second extendible, coilable member having a surface attached to the free end of the or at least one of the protrusions of the first member such that said second member can lie between the turns of said first member in its coiled state and is separated from the surface of the first member by the resilient protrusions in the extended state.

According to a second aspect of the present invention, there is provided an extendible member which is reversibly configurable between a coiled form and an extended form, the inner surface of which is provided with one or more resilient sheet members affixed to, or formed as part of the extendible member, and the resilient nature of which is such that upon extension of the member they adopt a relaxed state in which they protrude inwards from the surface of the member, but upon rolling can flex so as to lie within the interstices of the coil.

According to a third aspect of the present invention there is provided an extendible member which is reversibly configurable between a coiled form and an extended form, the outer surface of which is provided with one or more resilient sheet members affixed to or formed as part of the extendible member, and the resilient nature of which is such that upon extension of the member they adopt a relaxed state in which they protrude outwards from the surface of the member, but upon coiling can flex so as to lie within the interstices of the coil.

According to a fourth aspect of the present invention there is provided an extendible member which is reversibly configurable between a coiled form and an extended form, both surfaces of which are provided with one or more resilient sheet members, affixed to or formed as part of the extendible member, and the resilient nature of which is such that upon extension of the member they adopt a relaxed state in which they protrude inwards and outwards from the surfaces of the member, but upon coiling can flex so as to lie within the interstices of the coil.

According to a fifth aspect of the present invention there is provided an extendible member which is reversibly configurable between a coiled form and an extended form, one or both surfaces of which are provided with one or more resilient sheet members extending from the surface upon extension of the member, the ends of which are further attached to some other member, cable, optical fibre or other device which can lie in the interstices of the coil when the member is in the coiled state, but upon extension will be separated from the surface of the member and held away from the inner or outer surface by means of the resilient extensions to said surface described above.

BRIEF DESCRIPTION OF THE DRAWINGS

An embodiment of the present invention will now be described by way of example with reference to the accompanying drawings, in which.

DETAILED DESCRIPTION OF THE INVENTION

Figure 1:
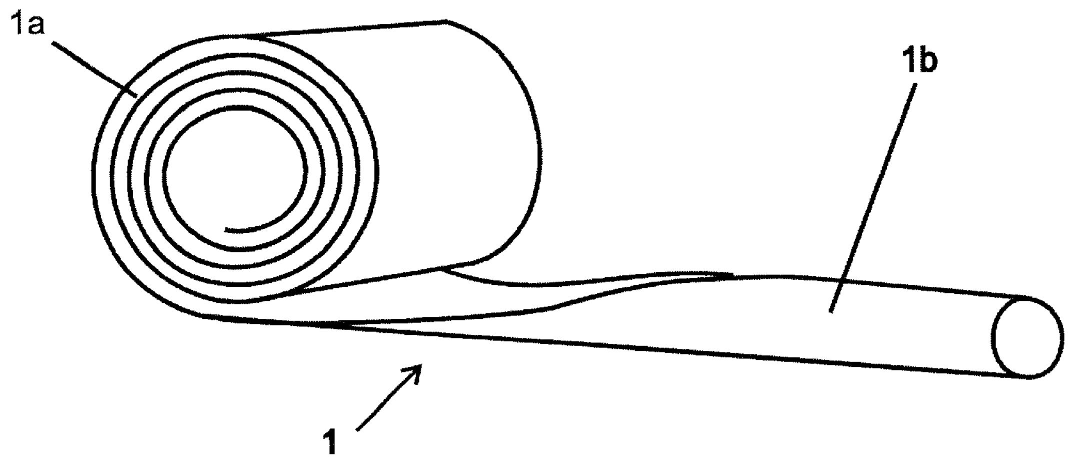
FIG. 1 is a perspective view of an example of an extendible, coilable member which is reversibly configurable between a coiled form and an extended form, showing the member in part coiled form and part extended form.
Figure 2:
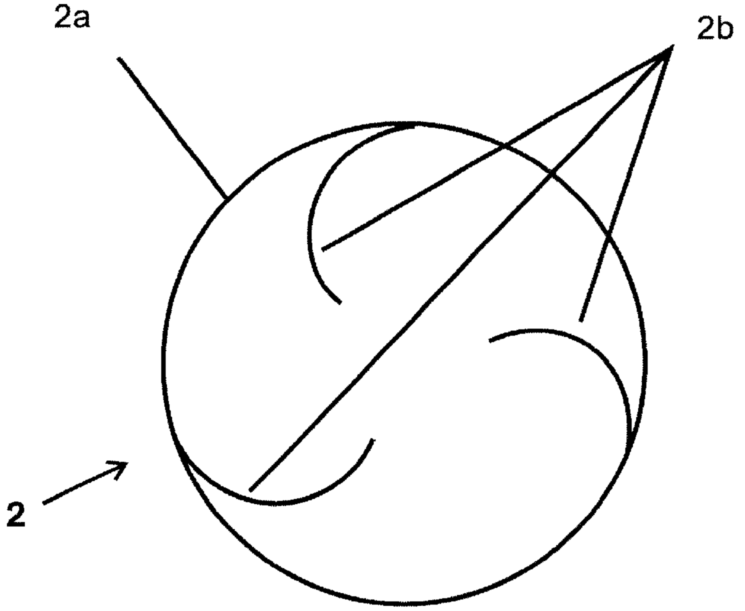
FIG. 2 is an end view of a first example of a member according to the present invention in its extended form.

Referring to FIG. 2, there is shown an end view of a first example of a member 2 according to the present invention. The member 2 is reversibly configurable between a coiled or rolled form and an un-rolled, longitudinally extended form. The member 2 is shown in its extended form 2*a* in FIG. 2. The member 2 may be manufactured and constructed in accordance with the teachings of WO-A-88/08620 or WO-A-97/35706 or may be of any other suitable form.

In the example shown, the inner surface of the member 2 is provided with a plurality of resilient protrusions 2*b* The protrusions 2*b* may be long sheet members which run the whole or substantially the whole or only a part of the length of the extended member 2. For example, there may be three long protrusions 2*b* of this type arranged at angles of 120° to each other around the inner surface of the member 2. As an alternative, the protrusions 2*b* may be in the form of groups of short fins 2*b*, the fins 2*b* being arranged equiangularly within the group and the groups repeated at intervals along the whole or substantially the whole or only a part of the length of the extended member 2. The groups may be arranged so that the various fins 2*b* all overlie each other when viewed from the end or the groups or some of the groups may be offset from each other to angularly space the or some of the fins 2*b* down the length of the extended member 2.

The protrusions 2*b* form spacers along the length of the member 2 such that, for example, if the member 2 is deployed around a pipe or other extended object, the protrusions 2*b* act to keep the member 2 spaced away from the outer surface of the pipe or other object, the member 2 thereby providing a jacket for said pipe or other object.

Figure 3:
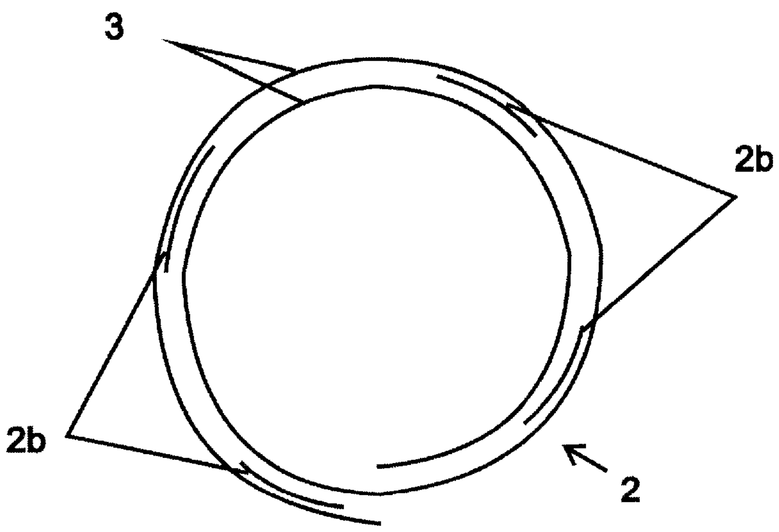
FIG. 3 is a cross-section through part of the member of FIG. 2 in its coiled form; and, FIG. 4 is an end view of a second example of a member according to the present invention having inner and outer skins.

When the member 2 is coiled from its extended form 2*a* to its coiled form, the protrusions 2*b* flex by virtue of their resilience, and so deform to lie within the turns 3 of the coiled member 2 as shown in FIG. 3. Similarly, when the member 2 is rolled from its coiled form to its extended form 2*a*, the protrusions 2*b* flex outwards to their deployed configuration.

If desired, provision may be made for the protrusions 2*b* to lie within cavities in the surface of the extendible member 2, such that they make no addition to the thickness of the member 2 in its coiled form.

The protrusions 2*b* may be made of the same material as the main body 2*a* of the extendible member 2 or may be made from a different material. The protrusions 2*b* may be integrally formed with the main body 2*a* of the extendible member 2 or may be affixed thereto by any suitable means including, for example, gluing or welding. Preferably, the protrusions 2*b* subtend an acute angle at their point of contact with the main body 2*a* to facilitate rolling of the member 2 to its coiled form. Similarly, the protrusions 2*b* preferably curve away from the surface of the main body 2*a* as shown.

Figure 4:
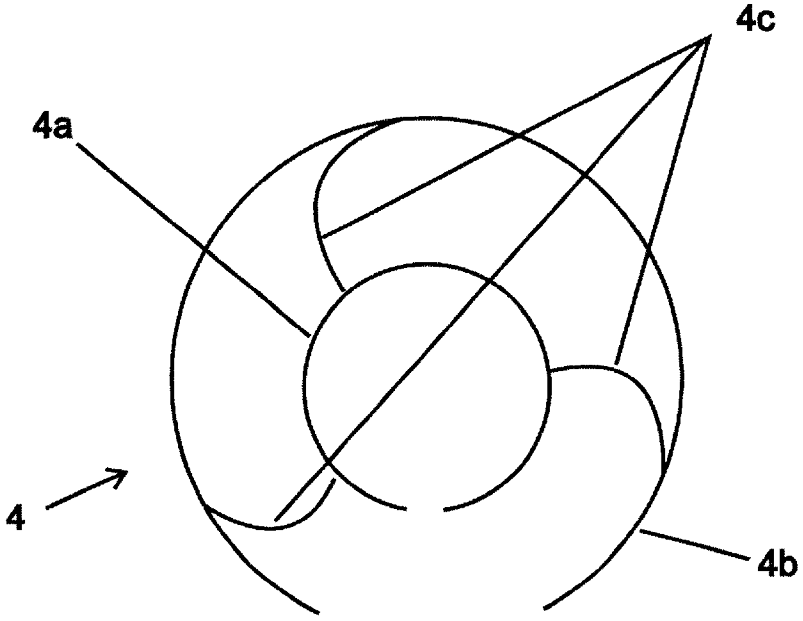

As shown in FIG. 4, a member 2 of this type may be combined with a further extendible member, either of the type disclosed in WO-A-88/08620 or WO-A-97/35706 or of any other suitable type, to form a member which upon extension forms a double skinned member 4, the inner and outer layers or skins 4*a*,4*b* of which are separated by the resilient protrusions 4*c*. The protrusions 4*c* may be fixed to or integrally formed with one or both of the inner and outer skins 4*a*,4*b*.

When rolled from the extended form to the coiled form, the two skins 4*a*,4*b* roll together, with the resilient protrusions 4*c* flexing so as to allow them to come into close proximity as they coil. In this case, the tensile and compressive flexibility of the extendible members providing the inner and outer skins 4*a*,4*b* are preferably such as to permit them to roll together over the desired length. Any number of further extendible members may be added in this manner to create multiple-skinned members.

When deployed over a pipe or other object as a jacket, or in the case of multiple skinned devices such as described above, the cavity or cavities formed between the extendible member 2 and the object over or around which it is placed, or the cavity or some or all of the cavities lying between the skins 4*a*,4*b* of the double or multiple skinned member 4, may be filled with foam or other material, such as to provide thermal, sound, and/or electrical insulation, and/or impact resistance and/or increased rigidity.

Where desirable, the edges of any extendible member may be joined or sealed, temporarily or permanently, by any desired means such as, for example, welding, zip-type fastening, etc. Where sealing is carried out on the edges of the skins of a multiple skinned device 4, a concentric pipe is created, capable of carrying separated or bidirectional flows.

Where desirable, cables, optical fibres, heating elements or any other device which can accept rolling may be incorporated into one or more of the extendible members.

It is expected that the present invention will prove of particular utility in the provision of insulated or heated jackets for the protection of pipelines, or other structures, where it can be deployed over said pipelines either at the time of laying, or retrofitted to existing installations, providing a protective insulating jacket, which may also incorporate means for monitoring the condition of said pipeline.

An embodiment of the present invention has been described with particular reference to the examples illustrated. However, it will be appreciated that variations and modifications may be made to the examples described within the scope of the present invention. For example, the protrusions 2*b* may be provided on the outer surface of the member 2 to protrude outwardly. Protrusions 2*b* may be provided on both the outer and inner surfaces of the member to protrude respectively outwardly and inwardly.

What is claimed is:

1. An extendible, rollable member comprising:

an elongated sheet member which is reversibly configurable between a rolled form and an un-rolled, longitudinally extended form, in said extended form said sheet member assuming a curled form and having inner and outer surfaces; and at least one resilient protrusion provided on at least one of said surfaces of said sheet member, each said protrusion being fixed along a length thereof to the respective surface of the sheet member along a length direction of the sheet member such that upon extension of the sheet member to the extended form, each protrusion adopts a first state in which it protrudes from the respective surface of the sheet member so as to project from a plane of the respective surface and such that upon rolling of the sheet member to the rolled form each protrusion flexes so as to lie between the turns of the rolled sheet member.

2. A member according to claim 1, wherein said at least one resilient protrusion is provided on said inner surface and each protrusion protrudes inwardly of the sheet member when said sheet member is in said extended form.

3. A member according to claim 1, wherein said at least one resilient protrusion is provided on said outer surface and each protrusion protrudes outwardly of the sheet member when said sheet member is in said extended form.

4. A member according to claim 1, wherein said inner and outer surfaces of said sheet member are each provided with at least one protrusion, each protrusion on the inner surface protruding inwardly of the member and each protrusion on the outer surface protruding outwardly of the sheet member when said sheet member is in said extended form.

5. An assembly comprising a first extendable, rollable member according to claim 1, and a second extendable, rollable member, wherein at least one said protrusion is fixed along a first longitudinal edge thereof to said respective surface and is fixed along a second longitudinal edge thereof, spaced from said first edge, to said second extendable, rollable member whereby said second member lies between the turns of said sheet member of said first member when the sheet member is in said rolled form and is separated from the respective surface of said sheet member of said first member by the at least one resilient protrusion when the sheet member is in said extended form.

6. An extendible member comprising:

an elongated sheet member which is reversibly configurable between a rolled form and an un-rolled, longitudinally extended form, in said extended form said sheet member assuming a curled form and having inner and outer surfaces; and at least one resilient sheet element, each said sheet element being fixed along a length thereof to said inner surface along a length direction thereof, and said sheet elements being resilient, whereby upon extension of the sheet member the sheet elements protrude inwards from the inner surface of the sheet member, but upon rolling of the sheet member the sheet elements flex so as to lie within the interstices of the rolled sheet member.

7. An extendible member comprising:

an elongated sheet member which is reversibly configurable between a rolled form and an un-rolled, longitudinally extended form, in said extended form said sheet member assuming a curled form and having inner and outer surfaces; and at least one resilient sheet element, each said sheet element being fixed along a length thereof to said outer surface along a length direction thereof, said sheet elements being resilient, whereby upon extension of the sheet member the sheet elements protrude outwards from the outer surface of the sheet member, but upon rolling of the sheet member the sheet elements flex so as to lie within the interstices of the rolled sheet member.

8. An extendible member comprising:

an elongated sheet member which is reversibly configurable between a rolled form and an un-rolled, longitudinally extended form, in said extended form said sheet member assuming a curled form and having inner and outer surfaces; and at least one resilient sheet element provided on each of said inner and outer surfaces, each said sheet element being fixed along a length thereof to said respective surface along a length direction thereof, said sheet elements being resilient, whereby upon extension of the sheet member the sheet elements protrude inwards and outwards from the surfaces of the sheet member, but upon rolling of the sheet member the sheet elements flex so as to lie within the interstices of the rolled sheet member.

9. An extendible member comprising:

a first, elongated sheet member which is reversibly configurable between a rolled form and an un-rolled, longitudinally extended form, in said extended form said first sheet member assuming a curled form and having inner and outer surfaces; and at least one resilient sheet element provided on at least one of said surfaces of said first sheet member, a first longitudinal edge of at least one said sheet element being fixed to said respective surface along a length direction thereof and said sheet element extending from a plane of the respective surface upon extension of the first sheet member, a second longitudinal edge of said sheet element being attached to a second member, whereby said second member lies in the interstices of the rolled first sheet member when the first sheet member is in the rolled form, and when the first sheet member is extended to the extended form, said second member is separated from the respective surface of the first sheet member and spaced from the respective surface by the at least one resilient sheet element.

10. An assembly comprising a first extendible, rollable member according to claim 2, and a second extendible, rollable member, wherein at least one said protrusion is fixed along a first longitudinal edge thereof to said respective surface and is fixed along a second longitudinal edge thereof, spaced from said first edge, to said second extendable, rollable member, whereby said second member lies between the turns of said sheet member in said rolled form and is separated from the respective surface of the sheet member by the at least one resilient protrusion in said extended form.

11. An assembly comprising a first extendible, rollable member according to claim 3, and a second extendible, rollable member, wherein at least one said protrusion is fixed along a first longitudinal edge thereof to said respective surface and is fixed along a second longitudinal edge thereof, spaced from said first edge, to said second extendable, rollable member, whereby said second member lies between the turns of said sheet member in said rolled form and is separated from the respective surface of the sheet member by the at least one resilient protrusion in said extended form.

12. An assembly comprising a first extendible, rollable member according to claim 4, and a second extendible, rollable member, wherein at least one said protrusion is fixed along a first longitudinal edge thereof to said respective surface and is fixed along a second longitudinal edge thereof, spaced from said first edge, to said second extendable, rollable member, whereby said second member lies between the turns of said sheet member in said rolled form and is separated from the respective surface of the sheet member by the at least one resilient protrusion in said extended form.

13. A member according to claim 1, wherein each said protrusion is integrally formed with said respective surface.

14. A member according to claim 1, wherein a plurality of resilient protrusions protrude from the respective surface of the sheet member.

* * * * *